(12) United States Patent
Huang et al.

(10) Patent No.: US 11,463,506 B2
(45) Date of Patent: Oct. 4, 2022

(54) LOAD RATIO BASED SCHEDULING METHOD FOR MULTIPLE FILE TRANSFER TASKS AND STORAGE DEVICE USING SAME

(71) Applicant: QNAP SYSTEMS, INC., New Taipei (TW)

(72) Inventors: Xiao-Wei Huang, New Taipei (TW); Chia-Hao Chen, New Taipei (TW); Chi-Lung Lin, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 128 days.

(21) Appl. No.: 17/039,890

(22) Filed: Sep. 30, 2020

(65) Prior Publication Data
US 2021/0409480 A1    Dec. 30, 2021

(30) Foreign Application Priority Data

Jun. 29, 2020 (TW) ................................. 109121923

(51) Int. Cl.
*H04L 67/06* (2022.01)
*G06F 9/48* (2006.01)
*H04L 67/1097* (2022.01)
*G06F 9/50* (2006.01)
*G06F 1/329* (2019.01)
*H04L 67/01* (2022.01)
*H04L 67/61* (2022.01)

(52) U.S. Cl.
CPC .............. *H04L 67/06* (2013.01); *G06F 1/329* (2013.01); *G06F 9/4881* (2013.01); *G06F 9/5038* (2013.01); *H04L 67/01* (2022.05); *H04L 67/1097* (2013.01); *H04L 67/61* (2022.05)

(58) Field of Classification Search
CPC ..... H04L 67/06; H04L 67/1097; H04L 67/42; G06F 9/4881; G06F 9/5038
See application file for complete search history.

(56) References Cited

U.S. PATENT DOCUMENTS

| | | | |
|---|---|---|---|
| 2009/0178049 A1* | 7/2009 | Branda | G06F 9/5077 718/104 |
| 2014/0101226 A1* | 4/2014 | Khandekar | H04L 67/28 709/203 |
| 2015/0249615 A1* | 9/2015 | Chen | G06F 9/45558 709/226 |
| 2015/0309097 A1* | 10/2015 | Baskaran | G01S 3/74 702/189 |
| 2019/0087124 A1* | 3/2019 | Mainetti | G06F 9/5077 |
| 2021/0329032 A1* | 10/2021 | Shaw | H04W 12/08 |

\* cited by examiner

*Primary Examiner* — Viet D Vu
(74) *Attorney, Agent, or Firm* — Guice Patents PLLC

(57) ABSTRACT

An online file transfer tasks scheduling method for processing multiple file path access requests in a network, the method including: sending at least one file path access request to a corresponding one of at least one file access service module, executing a processing procedure in each of the at least one file access service module to generate a task package according to each received file path access request, and using one or more task execution units to process one or more of the task packages; and using a task execution unit balance module to periodically evaluate a load ratio between a plurality of the file access service modules, and determining the number of the task execution units for each file access service module according to the load ratio.

14 Claims, 5 Drawing Sheets

LOAD RATIO BASED SCHEDULING METHOD FOR MULTIPLE FILE TRANSFER TASKS AND STORAGE DEVICE USING SAME

BACKGROUND OF THE INVENTION

Field of the Invention

The present invention relates to a scheduling method for multiple file transfer tasks, in particular to an online file transfer tasks scheduling method, which can adaptively adjust the assigned number of task execution units in multiple file access service modules of an information processing device when processing multiple file path access requests in a network, and each file access service module can prioritize multiple file transfer tasks according to a priority value.

Description of the Related Art

General scheduling methods for multiple file transfer tasks adopt first-come-first-served principle.

However, if a previous file transfer request involves a very large video file, and a subsequent file transfer request involves a small text file, the subsequent file transfer request is likely to wait for a long time to get serviced. In fact, in this case, if the subsequent file transfer request is served first, the impact on the waiting time for the previous file transfer request to get completed is minor. Therefore, there is still room for improving the performance of the conventional multiple file transfer tasks scheduling methods.

To solve the above-mentioned problem, a novel method for scheduling online file transfer tasks is needed.

SUMMARY OF THE INVENTION

One objective of the present invention is to provide an online file transfer tasks scheduling method, which can use multiple file access service modules in an information processing device to process multiple file path access requests in a network, and especially can adjust the ratio between respective numbers of task execution units in the file access service modules according to the load ratio of the file path access requests between the file access service modules, thereby optimizing the processing efficiency of file path access requests in the network.

Another objective of the present invention is to provide an online file transfer tasks scheduling method, which not only prioritizes multiple file path access requests in each file access service module, but can also prevent a new file path access request that uses a file access service module to access a small data file from waiting for a long time.

Another objective of the present invention is to provide a storage device capable of performing an online file transfer tasks scheduling method in a network, where the online file transfer tasks scheduling method can use multiple file access service modules in an information processing device of the storage device to process multiple file path access requests from the network, and especially can adjust the ratio between respective numbers of task execution units in the file access service modules according to the load ratio of the file path access requests between the file access service modules, thereby optimizing the processing efficiency of file path access requests in the network.

Still another objective of the present invention is to provide a storage device capable of performing an online file transfer tasks scheduling method in a network, where the online file transfer tasks scheduling method not only prioritizes multiple file path access requests in each file access service module, but can also prevent a new file path access request that uses a file access service module to access a small data file from waiting for a long time.

To attain the above objectives, an online file transfer tasks scheduling method is proposed, which is implemented by an information processing device executing a software program to handle multiple file path access requests in a network, the software program including a plurality of file access service modules, a task execution unit pool and a task execution unit balance module, where the information processing device allocates a predetermined number of task execution units to the task execution unit pool and the file access service modules, the method including:

sending at least one of the file path access requests to a corresponding one of the file access service modules, executing a processing procedure in each of the file access service modules to generate a task package according to each received one of the file path access requests, and using one or more of the task execution units to process one or more of the task packages; and using the task execution unit balance module to periodically evaluate a load ratio between the file access service modules, and executing a task execution unit allocation procedure according to the load ratio to determine a number of the task execution units in each of the file access service modules.

In possible embodiments, the load ratio can be a ratio between respective numbers of pending ones of the task packages in the file access service modules, or a ratio between respective sums of corresponding file sizes of all of the task packages in the file access service modules, or a ratio between respective sums of priority values of all of the task packages in the file access service modules.

In possible embodiments, the task execution unit allocation procedure includes using the task execution unit pool to move at least one of the task execution units from the task execution unit pool to one of the file access service modules, and/or move at least one of the task execution units from another one of the file access service modules to the task execution unit pool.

In one embodiment, each of the file access service modules includes a task generation module, a task dispatch module, a priority arrangement module, and a task execution module, and the processing procedure includes:

using the task generation module to set a priority value according to at least one file characteristic of a file corresponding to each file path access request, and generate the task package according to a combination of the priority value, an offset value and a file path or a combination of the priority value, an offset value, a file path and a file size;

using the task dispatch module to receive each one of the task packages and transfer each one of the task packages to the priority arrangement module, the priority arrangement module performing a prioritization process on one or more of the task packages and storing an ordered sequence of the one or more of the task packages in a queue, so that one of the one or more of the task packages that has the priority value higher than the priority values of the others of the one or more of the task packages in the queue is output from the queue first; and using at least one of the task execution units of the task execution module to each retrieve one of the one or more of the task packages from the queue and thereby process one or more of the file path access requests;

where, when the priority value of a new one of the task packages is higher than the lowest of the priority values of one or more of the task packages being executed in at least one of the task execution units, the task dispatch module causes one of the task execution units corresponding to the lowest one of the priority values to perform an update process on one of the one or more of the task packages being processed therein, output an updated one of the one or more of the task packages to the priority arrangement module and retrieve and process one of the one or more of the task packages from the queue, and the priority arrangement module performs the prioritization process on a plurality of the task packages therein.

In possible embodiments, the file path access request can be a read or write request for one of the files in a storage device mounted on a local network or an internet.

In possible embodiments, the file characteristic can be a file size or a file extension of the file.

In one embodiment, the priority value is an integer.

In one embodiment, the update procedure includes incrementing the priority value and updating the offset value with a current offset value of a corresponding file.

In one embodiment, the number of the task execution units reserved in at least one of the file access service modules is a non-negative integer specifiable number, and the information processing device has a user interface for a user to input the non-negative integer specifiable number.

To attain the above objectives, the present invention further provides a storage device having the aforementioned information processing device, where, if there is a remaining number of the task execution units after the number of the task execution units is dispatched according to the load ratio, the remaining number of the task execution units can be allocated to the file access service module having a higher load or allocated evenly or randomly to the file access service modules.

In possible embodiments, the information processing device has a plurality of central processing units or a multi-core central processing unit to execute the software program.

DETAILED DESCRIPTION OF THE PREFERRED EMBODIMENTS

To make it easier for our examiner to understand the objective of the invention, its structure, innovative features, and performance, we use preferred embodiments together with the accompanying drawings for the detailed description of the invention.

The principle of the present invention lies in:

(1) a plurality of file access service modules are installed in an information processing device to process multiple file path access requests in a network;

(2) a task execution unit balance module is provided in the information processing device to periodically evaluate a load ratio between the file access service modules, and determine the number of the task execution units for each file access service module according to the load ratio; and (3) each of the file access service modules is used to perform a ranking process on one or more task packages of at least one file path access request according to a priority value to generate a processing sequence, and the processing sequence will be updated when a new file path access request is generated.

Accordingly, the present invention can efficiently process multiple file path access requests, and can avoid a long wait for a new file path access request that requires access to a small data file.

Figure 1:
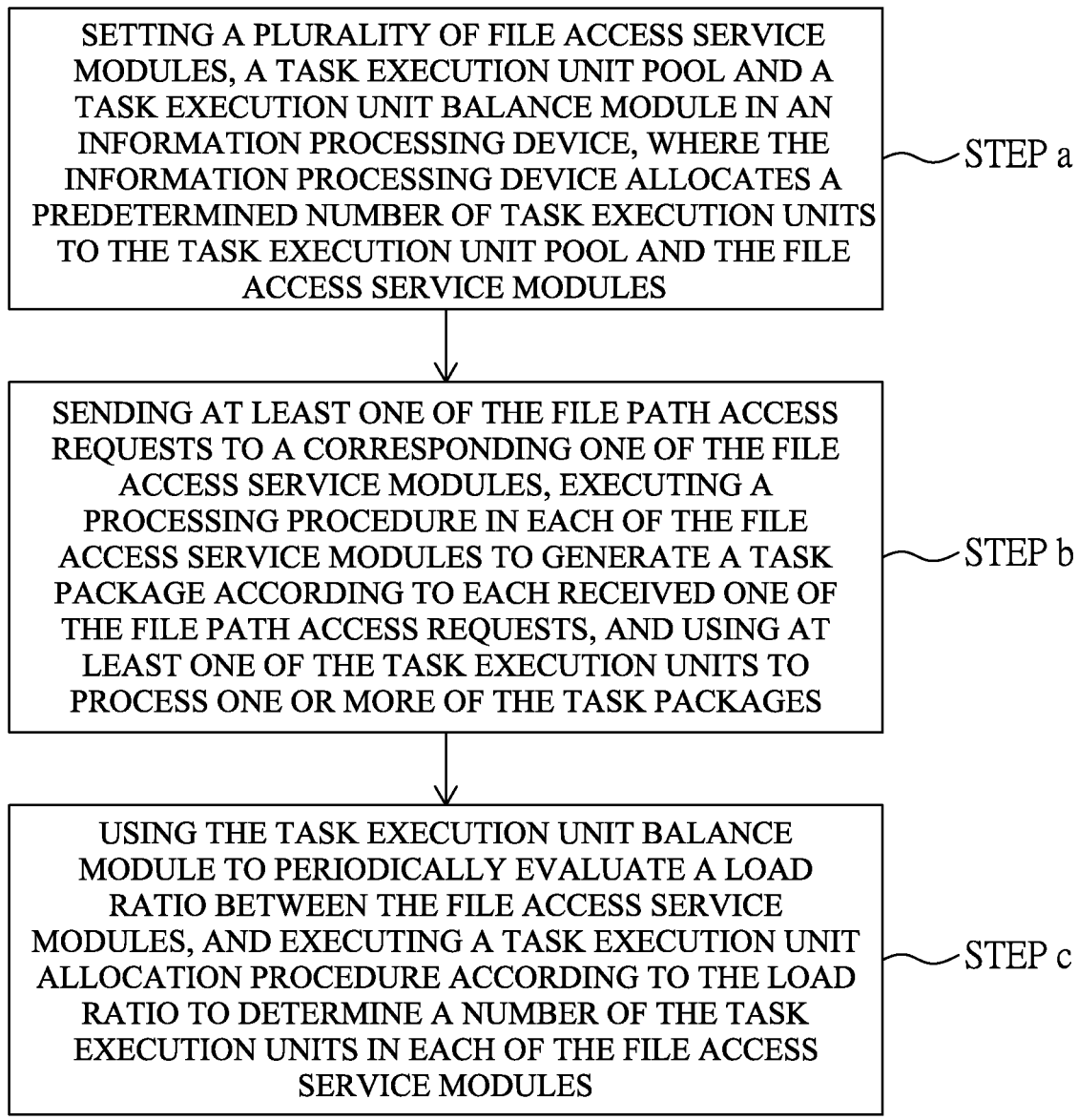
FIG. 1 illustrates a flowchart of an embodiment of an online file transfer task scheduling method of the present invention.

Please refer to FIG. 1, which illustrates a flowchart of an embodiment of an online file transfer task scheduling method of the present invention, the method being implemented by an information processing device executing a software program. As illustrated in FIG. 1, the method includes: setting a plurality of file access service modules, a task execution unit pool and a task execution unit balance module in an information processing device, where the information processing device allocates a predetermined number of task execution units to the task execution unit pool and the file access service modules (step a); sending at least one of the file path access requests to a corresponding one of the file access service modules, executing a processing procedure in each of the file access service modules to generate a task package according to each received one of the file path access requests, and using at least one of the task execution units to process one or more of the task packages (step b); and using the task execution unit balance module to periodically evaluate a load ratio between the file access service modules, and executing a task execution unit allocation procedure according to the load ratio to determine a number of the task execution units in each of the file access service modules (step c).

In step a, the file access service modules may provide remote access services via cloud storage service providers of the same type or different types, for example, via cloud storage service providers of Dropbox and Google Drive. In other words, if there are two file access service modules in total, and the cloud storage service providers include Dropbox and Google Drive, the types of service provider for these two file access service modules will have three combinations: two different accounts of Dropbox (Dropbox-account1, Dropbox-account 2), one account of Dropbox and one account of Google Drive (Dropbox-account, Google Drive-account), and two different accounts of Google Drive (Google Drive-account1, Google Drive-account2).

Figure 2:
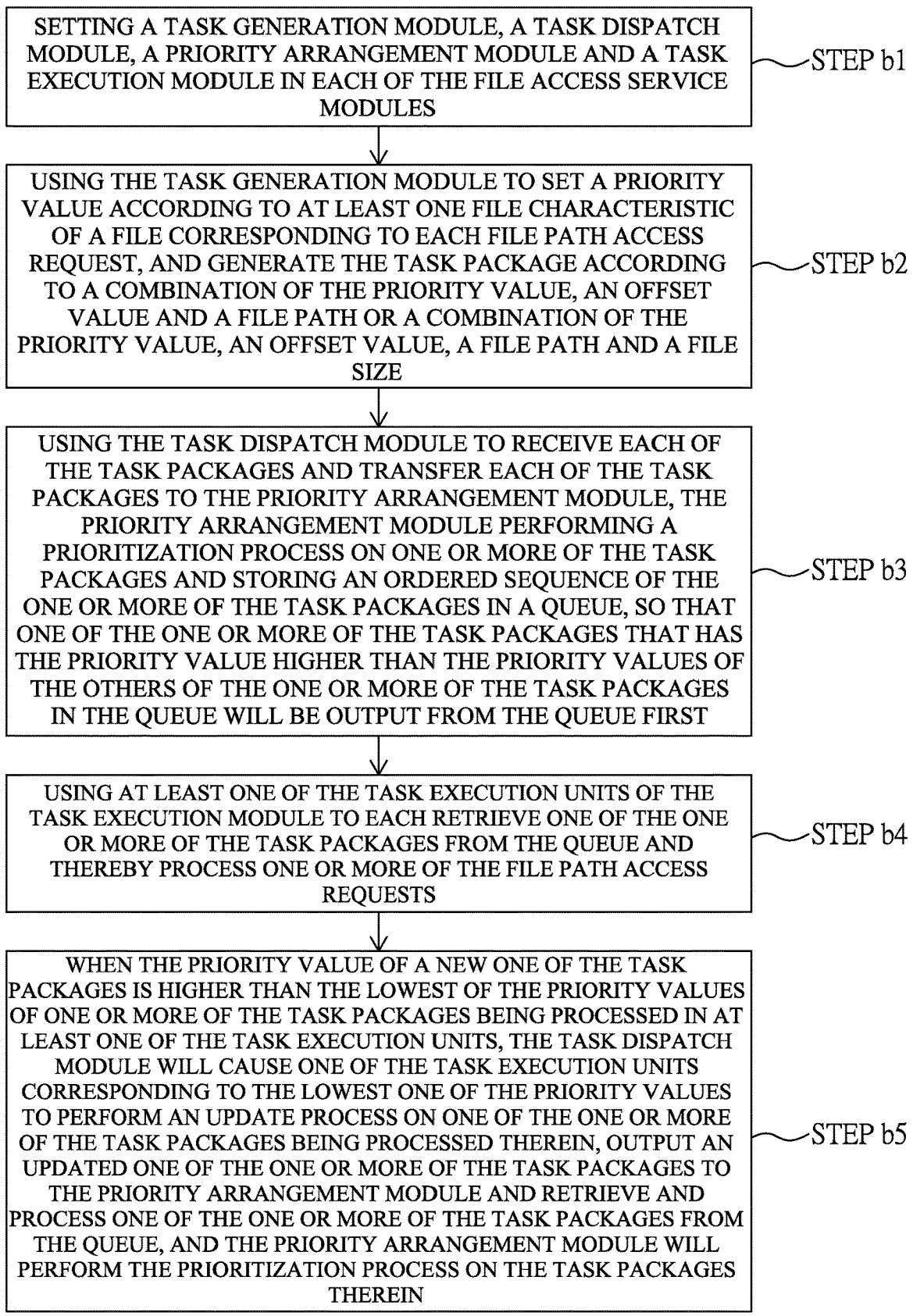
FIG. 2 illustrates a flowchart of an embodiment of the processing procedure in the online file transfer task scheduling method of FIG. 1.

In step b, the processing procedure can be implemented by the flowchart shown in FIG. 2. Please refer to FIG. 2, the processing procedure includes: setting a task generation module, a task dispatch module, a priority arrangement module and a task execution module in each of the file access service modules (step b1); using the task generation module to set a priority value according to at least one file characteristic of a file corresponding to each file path access request, and generate the task package according to a combination of the priority value, an offset value and a file path or a combination of the priority value, an offset value, a file path and a file size (step b2); using the task dispatch module to receive each of the task packages and transfer each of the task packages to the priority arrangement module, the priority arrangement module performing a prioritization process on one or more of the task packages and storing an ordered sequence of the one or more of the task packages in a queue, so that one of the one or more of the task packages that has the priority value higher than the priority values of the others of the one or more of the task packages in the queue will be output from the queue first (step b3); using at least one of the task execution units of the task execution module to each retrieve one of the one or more of the task packages from the queue and thereby process one or more of the file path access requests (step b4); and when the priority value of a new one of the task packages is higher than the lowest of the priority values of one or more of the task packages being processed in at least one of the task execution units, the task dispatch module will cause one of the task execution units corresponding to the lowest one of the priority values to perform an update process on one of the one or more of the task packages being processed therein, output an updated one of the one or more of the task packages to the priority arrangement module and retrieve and process one of the one or more of the task packages from the queue, and the priority arrangement module will perform the prioritization process on the task packages therein (step b5).

In step c, the load ratio can be a ratio between respective numbers of pending ones of the task packages in the file access service modules, or a ratio between respective sums of corresponding file sizes of all of the task packages in the file access service modules, or a ratio between respective sums of priority values of all of the task packages in the file access service modules.

In addition, in possible embodiments, the task execution unit allocation procedure includes responding to an allocation command from the task execution unit balance module to move at least one of the task execution units from the task execution unit pool to one of the file access service modules, or move at least one of the task execution units from another one of the file access service modules to the task execution unit pool, or move at least one of the task execution units from one of the file access service modules to the task execution unit pool and then move the at least one of the task execution units from the task execution unit pool to another one of the file access service modules.

In addition, the file path access request can be a read or write request for one of the files in a storage device mounted on a local network or an internet.

In addition, the file characteristic can be the file size or file extension of the file, and the priority value can be an integer. For example, a file with a file size no larger than 32M bytes can be defined as a small file, and a file with a size larger than 32M bytes is defined as a large file, the small file is given a priority value of 2, and the large file is given a priority value of 0; or files with extensions of text attribute (for example, TXT, PPT, XML, DTD, HTM, HTML, XHTML, DOC, PPS, XLS, SRT, XLSX, PPTX, DOCX, PDF) are given a priority value of 2, and files with extensions of media attribute (for example, JPG, JPEG, GIF, PNG, TIF, TIFF, BMP, CR2, CRW, ARW, SR2, DCR, KDC, NEF, MRW, PEF, RAF, 3FR, ERF, MEF, MOS, ORF, RW2, DNG, X3F, SRF, K25, PTX, TGA, RAW, JPEG, IIQ, INSP, MP3, AAC, WAV, WMA, FLAC, APE, M4A, OGG, AIFF, AU, AIF, M4R, DSF, DFF, M4B, MKA, WV, MPA, RA, IFO, BDMV, M2TS, AVI, MPG, MP4, WMV, TS, TP, ASF, M2T, MOV, M2V, MPEG, 3GP, MKV, MTS, TOD, MOD, TRP, M1V, M4V, RMP4, DIVX, FLU, ISO, RMVB, RM, MPV2, MP2V, INSV, F4V) are given a priority value of 0, and files with extensions of other attributes are given a priority value of 1; or files with extensions of video attribute are given a priority of 0, while files with extensions of other attributes are assigned a priority of 2.

In addition, the update procedure can include incrementing the priority value and updating the offset value with a current offset value of an offset address of a corresponding file, and the priority arrangement module will perform the prioritization process on plural task packages received from the task dispatch module or from both the task dispatch module and the task execution module, so that one of the task packages that has the highest priority value in the queue will be output from the queue first.

Figure 3:
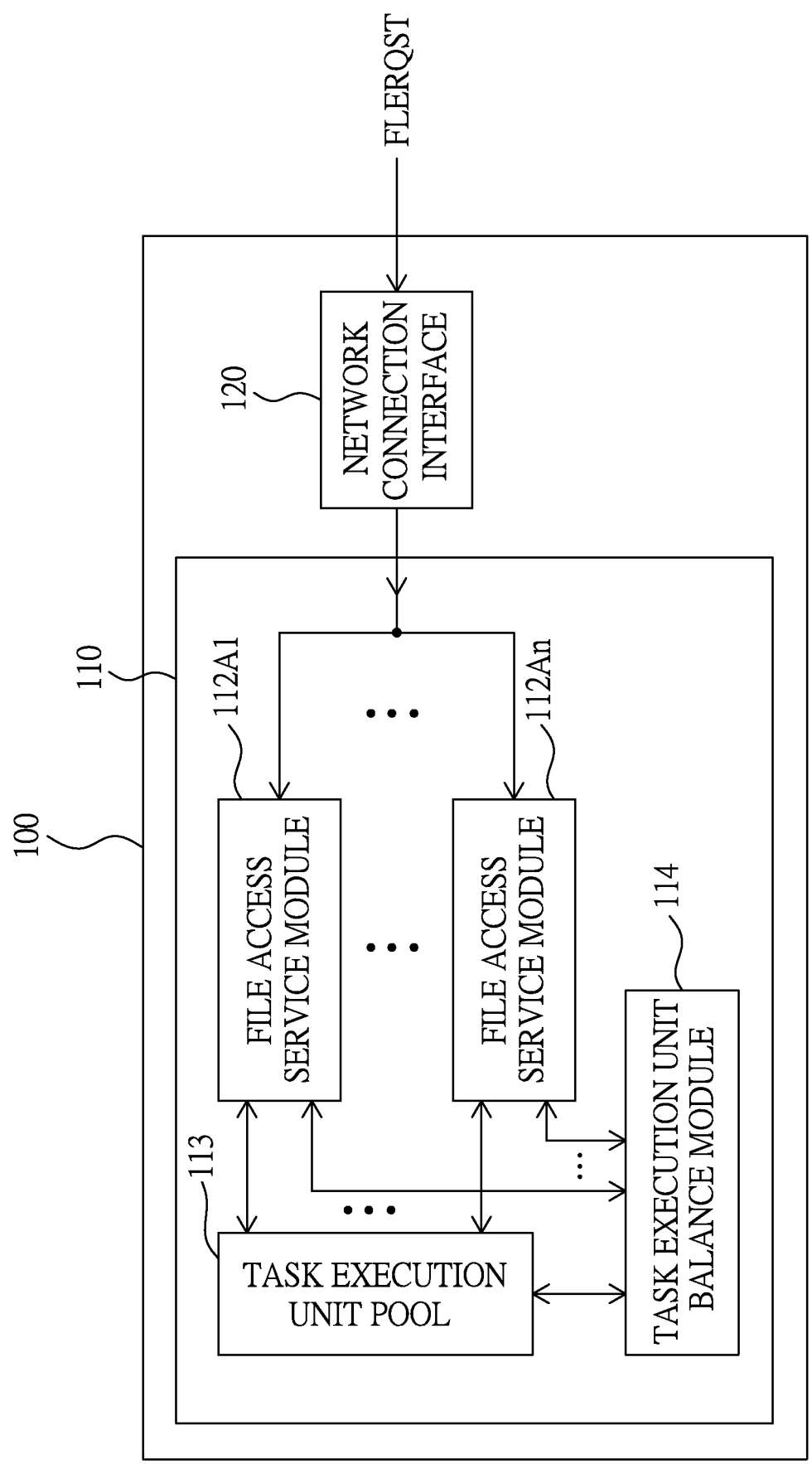
FIG. 3 is a block diagram of an embodiment of the storage device of the present invention.

Based on the above description, the present invention further provides a storage device. Please refer to FIG. 3, which illustrates a block diagram of an embodiment of the storage device of the present invention. As illustrated in FIG. 3, a storage device 100 includes an information processing device 110 and a network connection interface 120 to implement an online file transfer tasks scheduling method by executing a software program to connect a network via the network connection interface 120 and process multiple file path access requests FLERQST from the network. The information processing device 110 has n file access service modules 112A1-112An, a task execution unit pool 113, and a task execution unit balance module 114, where the information processing device 110 assigns a predetermined number of task execution units to the task execution unit pool 113 and n file access service modules 112A1-112An, n being an integer greater than 1.

When in operation, the software program will sequentially perform the following steps:

(1) the information processing device 110 transmits at least one file path access request FLERQST to a corresponding file access service module 112Ax, x being an integer greater than or equal to 1 and less than or equal to n, and executes a processing procedure in each of the n file access service modules 112A1-112An to generate a task package according to a received file path access request FLERQST, and uses at least one of the task execution units to execute one or more of the task packages; and (2) use the task execution unit balance module 114 to periodically evaluate a load ratio between the n file access service modules 112A1-112An, and execute a task execution unit allocation procedure according to the load ratio to determine the number of the task execution units in each file access service module 112A1-112An, and the task execution unit allocation procedure includes responding to an allocation command from the task execution unit balance module 114 to move at least one of the task execution units from the task execution unit pool 113 to one of the file access service modules 112A1-112An, or move at least one of the task execution units from one of the file access service modules 112A1-112An to the task execution unit pool 113, or move at least one of the task execution units from one of the file access service modules 112A1-112An to the task execution unit pool 113 and then move the at least one of the task execution units from the task execution unit pool 113 to another one of the file access service modules 112A1-112An.

Assume that in an actual application, the information processing device 110 includes two file access service modules 112A1 and 112A2, and in an initial setting, the information processing device 110 has a total of 18 task execution units, and the two file access service modules 112A1 and 112A2 are each assigned with 0 task execution units, and the task execution unit pool has 18 task execution units for dispatch. When in operation, assume that the task execution unit balance module 114 evaluates the load ratio between the two file access service modules 112A1 and 112A2 as 5:4. As a result, when executing the task execution unit dispatch process, the task execution unit balance module 114 will divide the 18 task execution units into two parts according to the load ratio (5:4)—10 task execution units for the file access service module 112A1 and 8 task execution units for the file access service module 112A2. In this example, the 18 task execution units of the information processing device 110 can be allocated at a ratio of 5:4 without any remaining numbers, and after the allocation, the file access service module 112A1 will have 10(0+10) task execution units, and the file access service module 112A2 will have 8 (0+8) task execution units to efficiently process each file path access request FLERQST.

In another actual application, the information processing device 110 includes two file access service modules 112A1 and 112A2, and in an initial setting, the information processing device 110 has a total of 20 task execution units, and the two file access service modules 112A1 and 112A2 are each assigned with 0 task execution units, and the task execution unit pool has 20 task execution units for dispatch. When in operation, assume that the task execution unit balance module 114 evaluates the load ratio between the two file access service modules 112A1 and 112A2 as 5:4. As a result, when executing the task execution unit dispatch process, the task execution unit balance module 114 will divide the 20 task execution units into two parts according to the load ratio (5:4)—10 task execution units for the file access service module 112A1 and 8 task execution units for the file access service module 112A2. In this case, the original 20 task execution units will have 2 task execution units remained. The task execution unit balance module 114 can allocate all the remaining two task execution units to the heavily loaded file access service module 112A1, or evenly distribute them to the file access service module 112A1 and the file access service module 112A2. That is, the file access service module 112A1 and the file access service module 112A2 will obtain 12 (10+2) task execution units and 8 (8+0) task execution units respectively, or 11 (10+1) respectively and 9 (8+1) task execution units respectively. That is, after the allocation, the file access service module 112A1 and the file access service module 112A2 will have 12(0+10+2) task execution units and 8 (0+8+0) task execution units respectively, or 11(0+10+1) task execution units and 9 (0+8+1) task execution units respectively to efficiently process each file path access request FLERQST.

In another actual application, the information processing device 110 includes two file access service modules 112A1 and 112A2, and in an initial setting, the information processing device 110 has a total of 20 task execution units, and the two file access service modules 112A1 and 112A2 are each assigned with 5 task execution units, and the task execution unit pool has 10 task execution units for dispatch. When in operation, assume that the task execution unit balance module 114 evaluates the load ratio between the two file access service modules 112A1 and 112A2 as 2:1. As a result, when executing the task execution unit dispatch process, the task execution unit balance module 114 will divide the 10 task execution units into two parts according to the load ratio (2:1)—6 task execution units for the file access service module 112A1 and 3 task execution units for the file access service module 112A2. In this case, the original 10 task execution units will have 1 task execution unit remained. The task execution unit balance module 114 can allocate the remaining 1 task execution unit to the heavily loaded file access service module 112A1, and the file access service module 112A1 and the file access service module 112A2 will obtain 7 (6+1) task execution units and 3 (3+0) task execution units respectively. That is, after the allocation, the file access service module 112A1 and the file access service module 112A2 will have 12(5+6+1) task execution units and 8 (5+3+0) task execution units respectively to efficiently process each file path access request FLERQST.

In addition, the information processing device 110 can have a user interface for a user to input a specifiable number for determining the reserved number of the task execution units in at least one file access service module 112, and the specifiable number can be a non-negative integer number, i.e., an integer number greater than or equal to 0.

Figure 4:
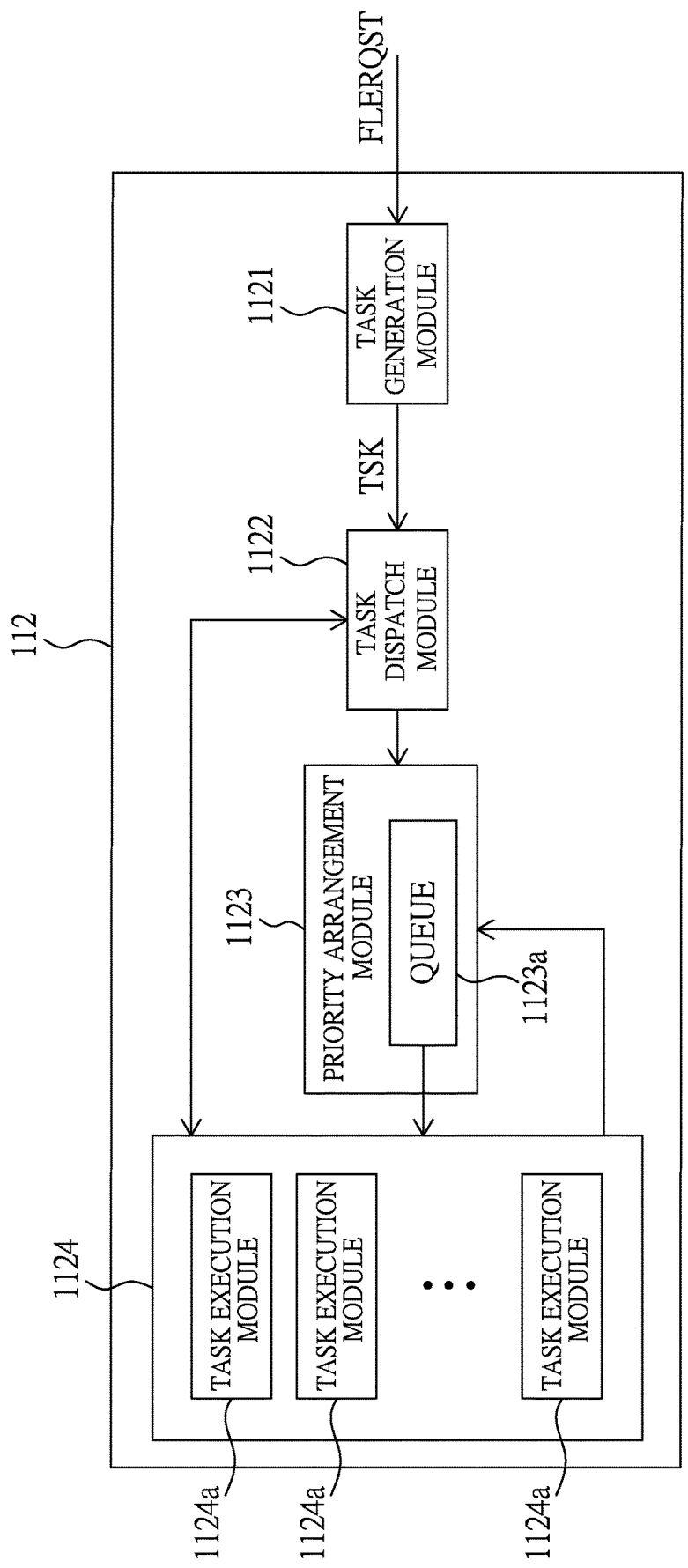
FIG. 4 is a block diagram of an embodiment of a file access service module in the storage device of FIG. 3.
Figure 5:
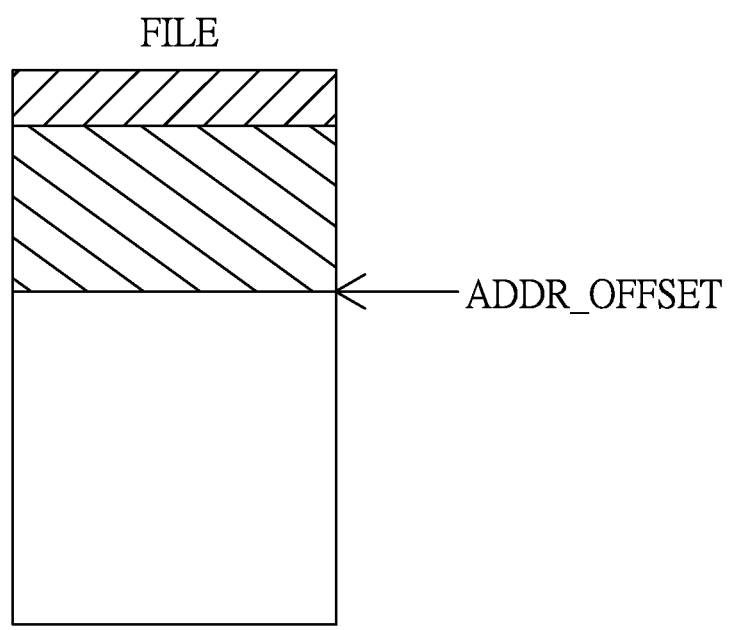
FIG. 5 illustrates a scenario that a file has a current access offset value of ADDR_OFFSET.

In addition, please refer to FIG. 4, which illustrates a block diagram of an embodiment of a file access service module in the storage device of FIG. 3. As illustrated in FIG. 4, the file access service module 112 includes a task generation module 1121, a task dispatch module 1122, a priority arrangement module 1123 and a task execution module 1124, where the priority arrangement module 1123 includes a queue 1123a, the task execution module 1124 includes a plurality of task execution units 1124a, and the processing procedure includes:

(1) using the task generation module 1121 to set a priority value according to at least one file characteristic of a file corresponding to each file path access request FLERQST, and generate a task package TSK according to the priority value, where each task package TSK includes the priority value, an offset value and a file path or includes the priority value, an offset value, a file path and a file size;

(2) using the task dispatch module 1122 to receive each task package TSK and transfer each task package TSK to the priority arrangement module 1123, the priority arrangement module 1123 performing a prioritization process on plural task packages TSK and storing an ordered sequence of the plural task packages TSK in a queue 1123a, so that one of the task packages TSK that has the priority value higher than the priority values of the others of the task packages TSK in the queue 1123a will be output from the queue 1123a first;

(3) using a plurality of task execution units 1124a of the task execution module 1124 to retrieve a task package TSK from the queue 1123a and thereby process a file path access request FLERQST respectively; and (4) when the task generating module 1121 receives a new file path access request FLERQST, if the priority value of a corresponding task package TSK of the new file path access request FLERQST is higher than the lowest one of the priority value of at least one task package TSK being processed by at least one task execution unit 1124a, the task dispatch module 1122 will cause the one of the at least one task execution unit 1124a that is executing a task package TSK with the priority value being the lowest one to perform an update procedure, pass an updated task package TSK to the priority arrangement module 1123 and retrieve and execute a task package TSK from the queue 1123a, and the priority arrangement module 1123 will perform a prioritization process on plural task packages TSK therein, where the update procedure includes increasing the priority value by 1 and updating the offset value with a current offset value of an offset address of a corresponding file. Please refer to FIG. 5, which illustrates a scenario that a file has a current access offset value of ADDR_OFFSET. Accordingly, the update procedure can update the offset value of a task package TSK from the original initial value (for example, 0) to ADDR_OFFSET.

In addition, the file path access request FLERQST can be a read or write request for a file in a storage device on a local network or an internet and can include a file access service module name, a file name and a remote file path (/object/path/on/cloud).

In addition, the file characteristic refers to the file size or file extension of the file, and the priority value is an integer.

For example, a file with a file size no larger than 32M bytes can be defined as a small file, and a file with a size larger than 32M bytes is defined as a large file, the small file is given a priority value of 2, and the large file is given a priority value of 0; or files with extensions of text attribute (for example, TXT, PPT, XML, DTD, HTM, HTML, XHTML, DOC, PPS, XLS, SRT, XLSX, PPTX, DOCX, PDF) are given a priority value of 2, and files with extensions of media attribute (for example, JPG, JPEG, GIF, PNG, TIF, TIFF, BMP, CR2, CRW, ARW, SR2, DCR, KDC, NEF, MRW, PEF, RAF, 3FR, ERF, MEF, MOS, ORF, RW2, DNG, X3F, SRF, K25, PTX, TGA, RAW, JPEG, IIQ, INSP, MP3, AAC, WAV, WMA, FLAC, APE, M4A, OGG, AIFF, AU, AIF, M4R, DSF, DFF, M4B, MKA, WV, MPA, RA, IFO, BDMV, M2TS, AVI, MPG, MP4, WMV, TS, TP, ASF, M2T, MOV, M2V, MPEG, 3GP, MKV, MTS, TOD, MOD, TRP, M1V, M4V, RMP4, DIVX, FLU, ISO, RMVB, RM, MPV2, MP2V, INSV, F4V) are given a priority value of 0, and files with extensions of other attributes are given a priority value of 1; or files with extensions of video attribute are given a priority of 0, while files with extensions of other attributes are assigned a priority of 2.

In addition, assume that the initial content of a task package TSK (priority value, offset value, source file path, destination file path) of a task execution unit 1124a is (0, 0, /path/to/my/file, /object/path/on/cloud), and the current offset value of the offset address of the file being transferred is 1024 when the task execution unit 1124a needs to perform the update process, then the content of the task package TSK (priority value, offset value, /path/to/my/file, /object/path/on/cloud) will be updated to (1,1024, /path/to/my/file, /object/path/on/cloud), where the "/path/to/my/file" refers to a file path in the storage device 100 and the "/object/path/on/cloud" refers to a file path of a remote storage service provider, and the task execution unit 1124a will pass an updated task package TSK to the priority arrangement module 1123. Next, the task execution unit 1124a will retrieve and execute a task package TSK from the queue 1123a.

To make the proposal of the present invention more clearly understood, the following discloses an application scenario:

Assume that the task execution module 1124 of the present invention has 10 task execution units 1124a in one embodiment; the priority value is defined as: the files with file extensions of the video attribute is given a priority value of 0, and files with file extensions of other attributes are given a priority value of 2; and a user issues a file path access request for reading a text file of "sales_report.doc" when the 10 task execution units 1124a are all processing a task package TSK respectively.

During the operation, the read request for the text file of the "sales_report.doc" will be converted into a task package TSK (with the priority value of 2), and the task package TSK (with the priority value of 2) will be passed to the priority arrangement module 1123 via the task dispatch module 1122 to undergo the prioritization process together with other task packages TSK in the priority arrangement module 1123, and the priority arrangement module 1123 will store an ordered sequence of all the task packages TSK into the queue 1123a.

Assume that the 10 task execution units 1124a are all busy and at least one of the 10 task execution units 1124a is processing a task package TSK requesting a file with a video file extension (with the priority value of 0, i.e., the lowest of the priority values), then there must be one task execution unit 1124a in the 10 task execution units 1124a required to perform the update procedure on the task package TSK it is processing, pass an updated task package TSK to the priority arrangement module 1123, and retrieve and execute a task package TSK from the queue 1123a. In addition, when the updated task package TSK is passed to the priority arrangement module 1123, the priority arrangement module 1123 will perform the prioritization process on all of the task packages TSK therein.

Accordingly, a task package TSK being processed for accessing a file with video file extension is replaced by a task package TSK generated by the read request of the text file of "sales_report.doc", that is, the read request of the "sales_report.doc" can be processed as soon as possible to prevent a long wait.

It can be seen from the above description that the present invention has the following advantages:

(1) The online file transfer tasks scheduling method of the present invention can use multiple file access service modules in an information processing device to process multiple file path access requests in a network, and especially can adjust the ratio of the number of task execution units between the file access service modules according to the load ratio of the file path access requests between the file access service modules, thereby optimizing the processing efficiency of file path access requests in the network.

(2) The online file transfer tasks scheduling method of the present invention not only prioritizes multiple file path access requests in each file access service module, but can also prevent a new file path access request that uses a file access service module to access a small data file from waiting for a long time.

(3) The storage device of the present invention can perform an online file transfer tasks scheduling method in a network, where the online file transfer tasks scheduling method can use multiple file access service modules in an information processing device of the storage device to process multiple file path access requests in the network, and especially can adjust the ratio of the number of task execution units between the file access service modules according to the load ratio of the file path access requests between the file access service modules, thereby optimizing the processing efficiency of file path access requests in the network.

(4) The storage device of the present invention can perform an online file transfer tasks scheduling method in a network, where the online file transfer tasks scheduling method not only prioritizes multiple file path access requests in each file access service module, but can also prevent a new file path access request that uses a file access service module to access a small data file from waiting for a long time.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An online file transfer tasks scheduling method, which is implemented by an information processing device executing a software program to handle multiple file path access requests in a network, the software program including a plurality of file access service modules, a task execution unit pool and a task execution unit balance module, wherein the information processing device allocates a predetermined number of task execution units to the task execution unit pool and the file access service modules, the method including:

sending at least one of the file path access requests to a corresponding one of the file access service modules, executing a processing procedure in each of the file access service modules to generate a task package according to each received one of the file path access requests, and using one or more of the task execution units to process one or more of the task packages; and using the task execution unit balance module to periodically evaluate a load ratio between the file access service modules, and executing a task execution unit allocation procedure according to the load ratio to determine a number of the task execution units in each of the file access service modules;

wherein the load ratio is selected from a group consisting of a ratio between respective numbers of pending ones of the task packages in the file access service modules, a ratio between respective sums of corresponding file sizes of all of the task packages in the file access service modules, and a ratio between respective sums of priority values of all of the task packages in the file access service modules.

2. The online file transfer tasks scheduling method of claim 1, wherein the task execution unit allocation procedure includes moving at least one of the task execution units from the task execution unit pool to one of the file access service modules, or moving at least one of the task execution units from one of the file access service modules to the task execution unit pool, or moving at least one of the task execution units from one of the file access service modules to the task execution unit pool and then moving the at least one of the task execution units from the task execution unit pool to another one of the file access service modules.

3. The online file transfer tasks scheduling method of claim 1, wherein each of the file access service modules includes a task generation module, a task dispatch module, a priority arrangement module, and a task execution module, and the processing procedure includes:

using the task generation module to set a priority value according to at least one file characteristic of a file corresponding to each file path access request, and generate the task package according to a combination of the priority value, an offset value and a file path or a combination of the priority value, an offset value, a file path and a file size;

using the task dispatch module to receive each of the task packages and transfer each of the task packages to the priority arrangement module, the priority arrangement module performing a prioritization process on one or more of the task packages and storing an ordered sequence of the one or more of the task packages in a queue, so that one of the one or more of the task packages with the priority value higher than the priority values of all other ones of the one or more of the task packages in the queue is output from the queue first; and using at least one of the task execution units of the task execution module to each retrieve one of the one or more of the task packages from the queue and thereby process at least one of the file path access requests respectively;

wherein, when the priority value of a new one of the task packages is higher than the lowest of the priority value of one or more of the task packages being processed in one or more of the task execution units, the task dispatch module causes one of the task execution units corresponding to the lowest one of the priority values to perform an update process on one said task package being processed therein to generate an updated task packet, output the updated task package to the priority arrangement module and retrieve and process one said task package from the queue, and the priority arrangement module performs the prioritization process on the task packages therein.

4. The online file transfer tasks scheduling method of claim 1, wherein the task execution unit allocation procedure includes moving at least one of the task execution units from the task execution unit pool to one of the file access service modules, or moving at least one of the task execution units from one of the file access service modules to the task execution unit pool, or moving at least one of the task execution units from one of the file access service modules to the task execution unit pool and then moving the at least one of the task execution units from the task execution unit pool to another one of the file access service modules.

5. The online file transfer tasks scheduling method of claim 4, wherein each of the file access service modules includes a task generation module, a task dispatch module, a priority arrangement module, and a task execution module, and the processing procedure includes:

using the task generation module to set a priority value according to at least one file characteristic of a file corresponding to each file path access request, and generate the task package according to a combination of the priority value, an offset value and a file path or a combination of the priority value, an offset value, a file path and a file size;

using the task dispatch module to receive each of the task packages and transfer each of the task packages to the priority arrangement module, the priority arrangement module performing a prioritization process on one or more of the task packages and storing an ordered sequence of the one or more of the task packages in a queue, so that one of the one or more of the task packages that has the priority value higher than the priority values of all other ones of the one or more of the task packages in the queue is output from the queue first; and using one or more of the task execution units of the task execution module to each retrieve one of the one or more of the task packages from the queue and thereby process one said file path access request respectively;

wherein, when the priority value of a new one of the task packages is higher than the lowest of the priority value of one or more of the task packages being processed in one or more of the task execution units, the task dispatch module causes one of the task execution units corresponding to the lowest one of the priority values to perform an update process on one said task package being processed therein to generate an updated task package, output the updated task package to the priority arrangement module and retrieve and process one said task package from the queue, and the priority arrangement module performs the prioritization process on the task packages therein.

6. The online file transfer tasks scheduling method of claim 3, wherein the file path access request is a read or write request for one of the files in a storage device mounted on a local network or an internet.

7. The online file transfer tasks scheduling method of claim 3, wherein the file characteristic is a file size or a file extension of the file.

8. The online file transfer tasks scheduling method of claim 6, wherein the file characteristic is a file size or a file extension of the file.

9. The online file transfer tasks scheduling method of claim 3, wherein the priority value is an integer.

10. The online file transfer tasks scheduling method of claim 8, wherein the priority value is an integer.

11. The online file transfer tasks scheduling method of claim 9, wherein the update procedure includes incrementing the priority value and updating the offset value with a current offset value of an offset address of a corresponding file.

12. The online file transfer tasks scheduling method of claim 9, wherein the number of the task execution units reserved in at least one of the file access service modules is a non-negative integer specifiable number, and the information processing device has a user interface for a user to input the non-negative integer specifiable number.

13. The online file transfer tasks scheduling method of claim 11, wherein the number of the task execution units reserved in at least one of the file access service modules is a non-negative integer specifiable number, and the information processing device has a user interface for a user to input the non-negative integer specifiable number.

14. A storage device having the information processing device as disclosed in claim 12, wherein if there is a remaining number of the task execution units after the number of the task execution units is dispatched according to the load ratio, the remaining number of the task execution units are allocated to the file access service module having a higher load or allocated evenly or randomly to the file access service modules.

* * * * *